Patented June 17, 1947

2,422,609

UNITED STATES PATENT OFFICE 2,422,609

PRODUCTION OF METALLIC SURFACE LAYERS

Max Auwärter, Hanau-on-the-Main, Germany; vested in the Attorney General of the United States No Drawing. Application April 19, 1937, Serial No. 137,892. Renewed December 14, 1938. In Germany December 10, 1936

Sections 3 and 14, Public Law 690, August 8, 1946.
Patent expires December 10, 1956

4 Claims. (Cl. 91—70.1)

The present invention relates to the production of metallic surface layers.

It has been found, that extremely valuable metallic surface layers may, in a simple manner, be produced, if metals in the form of structures with great surface, for instance strips or bands which have a melting point above 600° C. are heated in a vacuum of at least $10^{-3}$ mm. Hg and the sublimed metal is condensed upon materials arranged in the neighbourhood of these strips or bands.

According to the invention, metals in the form of strips or other structures having a melting point above 600° C. are heated to temperatures below the melting point for instance by direct electrical heating. The new method, therefore, does not require carriers, for instance tungsten boats or tungsten spirals, which usually are used for evaporating high melting metals. Here already the new method presents an advantage as contaminations by the substance of the carrier are excluded. The vacuum is chosen in such a manner, that sufficient atoms of the metal are present in the gas space and meet the material to be coated without on an average colliding with other atoms in the gas space. The free length of the way is then about equal to the distance between the metallic strip or band and the material. For this purpose generally a vacuum of at least $10^{-3}$ mm. Hg and often even of $10^{-4}$ mm. Hg and still higher is required. In this manner, melting of the metal is not required and an unobjectionable surface layer may quickly be formed upon the material at relatively low temperatures also. As compared with the hitherto known methods layers of more uniformity and purity are obtained in this manner. By arranging the surface of the material opposite a great surface of the heated metal, an extraordinarily uniform distribution of the condensed metal is warranted, when using the above indicated vacuum which, for instance, is of great importance in the manufacture of mirrors and optical measuring instruments with surface layers which are partially permeable to light. Such layers cannot be obtained, if the metals are evaporated at high temperatures in tungsten boats or in tungsten spirals.

The most different kinds of materials including electrically bad conductive materials, as glass, quartz and ceramic materials, furthermore minerals, inorganic and organic substances may be coated by the new method with metals having a melting point above 600°. Before the treatment according to the invention, the surface of the material is preferably thoroughly cleansed and in particular freed from traces of grease and so on.

The most different kinds of devices may be used to carry out the new method. So for instance the small sides of rectangular strips or bands of metals, melting above 600°, may be fixed in copper jaws and directly be heated by an electric current. According to the particular requirements, the metal bands or strips may have the same dimensions as the material to be coated or they may have greater or smaller dimensions. To warrant the uniformity of the coating when using strips or bands of smaller dimensions than the surface of the material to be coated, the band or strip or the material is moved during the time the method is carried out.

The layers may be produced in different thicknesses. The new method is of extremely great value in the manufacture of the most different articles.

The new method has proved of great success in the manufacture of coatings from base metals, for instance aluminium. For the manufacture of coatings from base metals of the 7 and 8 group of the periodic system, for instance for the manufacture of coatings from manganese and nickel, the new method is of particular advantage.

Technically valuable articles are obtained by the use of the new method in connection with precious metals, for instance gold, and quite particularly in connection with platinum metals, for instance platinum, rhodium and ruthenium. By means of the new method mirrors capable of resisting atmospheric influences, surface layers partially permeable to light, and resistances and condensers adapted to be highly loaded may be produced which have surprisingly valuable qualities. With platinum metals, besides the above mentioned qualities, in particular the uniformity of the coatings, a high chemical and mechanical stability results.

Rhodium coatings obtained according to the new method are in particular characterized by a surprisingly high reflecting power and an extremely adhesive strength to the basis. It is impossible to damage the layer by means of a well sharpened pencil pressed against said layer by hand. The layer, moreover, resists the treatment with a polishing leather, with medicated cotton-wool, with brushes of badger bristles and the like. The adhesive strength of the layers may still be considerably improved by subjecting them to an after-treatment, for instance by rubbing them with a polishing leather or with medicated cotton-wool soaked with a good lubricating means and the like. In this manner coatings are produced against which the point of a pair of scissors may be rubbed without damaging the surface. Whereas hitherto coatings of similar kinds could be produced only which could be cleansed by skilled persons only, surface layers may be obtained with a new method which may be cleansed by unskilled labourers with cleansing pastes, ordinary cleaning leathers, cotton cloth, etc. The new method also allows the manufacture of mirrors which are far superior to mirrors made according to known methods. The mirrors are of excellent optical qualities and are simultaneously extraordinarily stable against chemical and mechanical influences.

*Examples*

1. A rhodium sheet of a length of several centimetres and a width of several millimetres is clamped between two water-cooled copper jaws and heated by direct electrical heating to a temperature between 1400° and 1850° C. In a distance of 2–40 cm., for instance 8–10 cm., a facet glass article is fixed which according to a usual method has been perfectly freed from grease. The device is arranged in an air-tight container which is evacuated to $10^{-4}$ mm. Hg. An extremely uniform, adhesive surface of rhodium is obtained upon the glass which may be further fixed by polishing in the manner above described. Depending on the duration of sublimation, this layer is partially permeable to light and forms a mirror of considerable reflecting power.

2. In the device described in Example 1, a rhodium strip of a length of 30 cm. and a width of 15 cm. is heated in a vacuum of $10^{-4}$ mm. Hg to a temperature of 1500°. Opposite the strip or band a glass plate of the dimension of 35 by 35 cm. surface is fixed which is rotated during carrying out of the method. A perfectly uniform surface layer of rhodium is obtained which may be used for many purposes.

In a similar manner, a parabolic rotary body having an orifice of a diameter of 35 cm. may be coated with a perfectly uniform layer of rhodium. The surface mirror so obtained absolutely resists corrosion. The coating is equally well fixed to all points of the basis.

3. Upon thin asbestos layers of a surface of 50 by 100 cm. platinum is deposited in a vacuum of $10^{-4}$ mm. Hg which is sublimed from a broad platinum band or strip heated to temperatures below the melting point. The asbestos layer provided with a uniform platinum coating is employed for the manufacture of resistances, capable of being highly loaded and used for very high currents. Such coated asbestos layers are perfectly stable against oxidation and have a constant value of resistance.

It is well known to produce surface layers by evaporating of supports. It may also be derived from physical considerations that the manner of evaporation is dependent on the specific surface of the evaporating metal.

What I claim is:

1. The method of producing metallic surface layers, which comprises heating a metal sheet in a vacuum of at least $10^{-3}$ mm. Hg, to a temperature below the melting point of the metal sheet, the metal to be deposited being in the form of broad bands having a great surface arranged opposite the surface to be coated, and the metal sheet being directly heated by electric current whereby the use of a carrier for the metal sheet is not required and contamination by the substances of the carrier are excluded, to effect sublimation of metal from the metal sheet, and condensing sublimed metal upon an article having the surface to be coated and located at a predetermined distance.

2. The method of producing metallic coatings according to claim 1, in which the metal sheet from which metal is sublimed has a melting point above 600° C.

3. The method of producing metallic coatings according to claim 1, in which the metal of the sheet from which metal is sublimed is selected from a group of metals consisting of metals of the seventh and eighth groups of the periodic system.

4. The method of producing metallic coatings according to claim 1, in which the metal sheet from which metal is sublimed comprises rhodium.

MAX AUWÄRTER.

REFERENCES CITED

The following references are of record in the file of this patent:

UNITED STATES PATENTS

| Number | Name | Date |
|---|---|---|
| 1,584,728 | Case | May 18, 1926 |
| 1,738,991 | Fink et al. | Dec. 10, 1929 |
| 2,067,907 | Edwards | Jan. 19, 1937 |
| 2,074,281 | Sommer | Mar. 16, 1937 |
| 2,079,784 | Williams | May 11, 1937 |

OTHER REFERENCES

Gardner et al., "The Making of Mirrors by the Deposition of Metal on Glass," Jan. 6, 1931. Circular of The Bureau of Standards, No. 389, p. 10, paragraph c; p. 17, lines 11, 12.